(12) United States Patent
Lesur

(10) Patent No.: US 8,356,841 B2
(45) Date of Patent: Jan. 22, 2013

(54) CUSTOMISED MULTI-LAYER CARD COMPRISING FRACTURE INITIATION SCORES AND METHOD OF PRODUCING ONE SUCH CARD

(75) Inventor: Jean-Luc Lesur, Bras (FR)

(73) Assignee: Gemalto SA, Meudon (FR)

( * ) Notice: Subject to any disclaimer, the term of this patent is extended or adjusted under 35 U.S.C. 154(b) by 2069 days.

(21) Appl. No.: 10/524,563

(22) PCT Filed: Aug. 13, 2003

(86) PCT No.: PCT/FR03/02532
§ 371 (c)(1),
(2), (4) Date: Feb. 14, 2005

(87) PCT Pub. No.: WO2004/016445
PCT Pub. Date: Feb. 26, 2004

(65) Prior Publication Data
US 2005/0253375 A1    Nov. 17, 2005

(30) Foreign Application Priority Data

Aug. 13, 2002 (FR) ...................... 02 10281

(51) Int. Cl.
*B42D 15/00* (2006.01)
*G09C 3/00* (2006.01)
*B32B 7/14* (2006.01)
*B32B 3/00* (2006.01)
*B32B 5/16* (2006.01)

(52) U.S. Cl. ............. 283/94; 283/74; 283/75; 283/81; 283/100; 283/107; 283/108; 283/109; 283/110; 283/86; 428/172; 428/203; 428/204

(58) Field of Classification Search ............ 283/74, 283/75, 81, 94, 100, 101, 105, 107–110, 283/86; 428/43, 172, 203, 204
See application file for complete search history.

(56) References Cited

U.S. PATENT DOCUMENTS

| | | | | |
|---|---|---|---|---|
| 2,588,067 | A | * | 3/1952 | Whitehead ............... 283/108 |
| RE25,005 | E | * | 7/1961 | Hannon ................... 283/94 |
| 3,388,661 | A | * | 6/1968 | Decof ..................... 283/77 |
| 4,313,984 | A | * | 2/1982 | Moraw et al. ............. 428/13 |
| 4,343,851 | A | | 8/1982 | Sheptak |
| 4,456,639 | A | * | 6/1984 | Drower et al. ............ 428/13 |
| 4,469,353 | A | | 9/1984 | Anarwala |
| 4,579,754 | A | * | 4/1986 | Maurer et al. ............ 428/29 |
| 5,090,736 | A | * | 2/1992 | Minkus .................... 283/77 |
| 6,302,444 | B1 | * | 10/2001 | Cobben .................. 283/72 |
| 6,752,432 | B1 | * | 6/2004 | Richardson ............. 283/91 |
| 2002/0027359 | A1 | * | 3/2002 | Cobben et al. ........... 283/67 |

FOREIGN PATENT DOCUMENTS

| | | |
|---|---|---|
| EP | 0 496 988 | 8/1992 |
| GB | 2132136 A * | 7/1984 |

* cited by examiner

*Primary Examiner* — Dana Ross
*Assistant Examiner* — Justin V Lewis
(74) *Attorney, Agent, or Firm* — Buchanan Ingersoll & Rooney PC

(57) ABSTRACT

The invention relates to a customized multi-layer support which takes the general form of a card, such as an identification card. The support includes a card body, the upper face of which is provided with externally-visible personal information; and a film which is at least partially transparent and which is fixed to the upper face of the card body. The support has boundary lines which define the areas of the aforementioned film with reduced or increased mechanical strength. The invention also relates to a method of producing one such customized support.

10 Claims, 2 Drawing Sheets

CUSTOMISED MULTI-LAYER CARD COMPRISING FRACTURE INITIATION SCORES AND METHOD OF PRODUCING ONE SUCH CARD

This disclosure is based upon French Application No. 02/10281, filed Aug. 13, 2002, and International Application No. PCT/FR2003/002532, filed Aug. 13, 2003, the contents of which are incorporated herein by reference.

BACKGROUND OF THE INVENTION

The present invention relates to a personalized multilayer support in the general shape of a card.

The present invention relates in particular to cards of the laminated type, that is to say to cards which comprise several layers of plastic which are superposed on one another and bonded to one another by hot lamination.

In general, a personalized multilayer support in the general shape of a card, such as an identification card, comprises:
- a card body which is provided on an upper face with personal information which is visible from outside,
- an at least partially transparent film which is fixed to the upper face of the card body.

In most laminated cards which comprise information printed on one face, for example bank cards and identity cards, the adhesion between the card body and the transparent film is obtained by using an adhesive coating.

A protective layer is often bonded to the upper face of the transparent film, by means of an adhesive coating, with a view to protecting the color photograph or the personal information written on the plastic card.

Using special means, it is possible to separate ("delaminate") two layers of the card, which makes it possible for criminals to modify the personal information and then to bond the two layers to one another once again.

At present, in the field of identity cards, it is acknowledged that this possibility of separating two layers of the card represents a significant weakness of plastic cards in terms of guaranteeing the authenticity of the information contained thereon.

SUMMARY OF THE INVENTION

The invention aims in particular to overcome these drawbacks.

To this end, the invention proposes a personalized multilayer support in the general shape of a card, such as an identification card, comprising:
- a card body which is provided on an upper face with personal information which is visible from outside,
- an at least partially transparent film which is fixed to the upper face of the card body,
- marker lines which delimit zones of the film having reduced or increased mechanical strength, forming tear scores so that the film is torn if an attempt is made to peel off the film,
- characterized in that the marker lines depict at least one identification motif which is visible from outside.

According to other features of the invention:
- the marker lines comprise weld beads formed at the interface between the film and the card body;
- the marker lines comprise grooves formed in at least one of the faces of the film;
- the grooves pass through the entire thickness of the film;
- the upper face of the transparent film is covered with a transparent protective layer;
- the upper face of the transparent film comprises personal information;
- the transparent film is fixed to the upper face of the card body by bonding by means of an adhesive coating.

The invention also proposes a method of manufacturing a personalized multilayer support in the general shape of a card, such as an identification card, of the type comprising:
- an "assembly" step, during which an at least partially transparent film is fixed to the upper face of a card body,
- a "personalization" step, during which personal information is placed on the upper face of the card body so that the personal information is visible from outside through the transparent film,
- characterized in that, after the assembly step, a "security" step is carried out, during which marker lines are produced by means of a laser beam so as to delimit zones of the film having reduced or increased mechanical strength, forming tear scores with a view to causing the film to be torn if an attempt is made to peel off the film.

According to other features of the method according to the invention:
- the marker lines are produced by forming grooves on at least one face of the transparent film;
- the marker lines are produced by forming weld beads at the interface between the transparent film and the card body;
- the marker lines are produced by forming grooves on at least one face of the transparent film and marks and/or welds at the interface between the transparent film and the adjacent card body, in line with the grooves.

BRIEF DESCRIPTION OF THE DRAWINGS

Other features and advantages of the invention will emerge from reading the following detailed description which will be better understood with reference to the appended drawings, in which.

DETAILED DESCRIPTION

Figure 1:
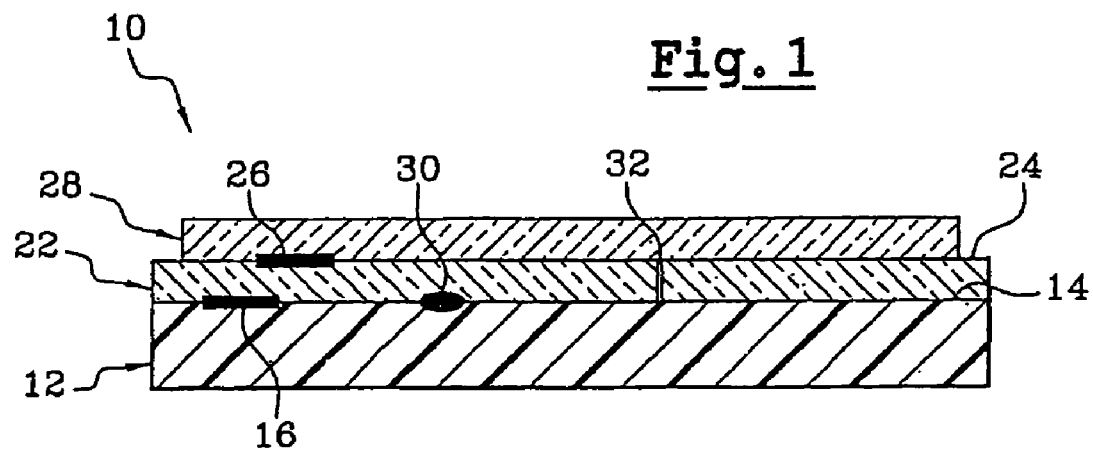
FIG. 1 is a view in section which schematically shows a personalized multilayer card produced in accordance with the teaching of the invention.
Figure 2:
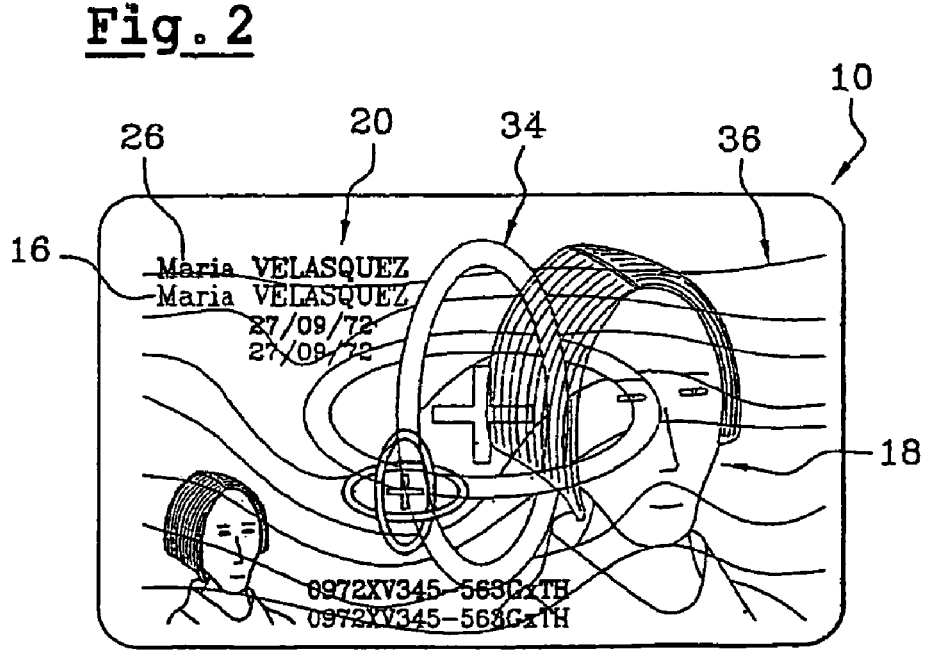
FIG. 2 is a view from above which schematically shows the personal information and identification information borne by the card of FIG. 1.

FIGS. 1 and 2 show a personalized multilayer support 10 which is produced in accordance with the teaching of the invention.

The personalized multilayer support 10 is in this case an identification card, for example a national identity card.

The card 10 comprises a card body 12 which is made of an opaque plastic material and which bears, on its upper face 14, personal information 16 of the card 10.

The personal information 16 comprises for example a photograph 18 of a person and alphanumeric characters 20 relating to the identity of the person, as shown in FIG. 2.

A transparent film 22 is bonded to the upper face 14 of the card body 12.

The film 22 may be partially transparent, that is to say it may be transparent only above the personal information 16, which must be visible from outside.

According to the embodiment shown here, the film 22 bears, on its upper face 24, personal information 26 which is redundant with respect to the personal information 16 borne by the card body 12.

In FIG. 2, the personal information 16 borne by the card body 12 is shown in fine lines and the personal information 26 borne by the film 22 is shown in bold lines.

Advantageously, a transparent film 28 which forms a protective layer is bonded to the upper face 24 of the film 22 and covers the latter.

In accordance with the teaching of the invention, the card 10 comprises marker lines 30, 32 which delimit zones of the film 22 having reduced or increased mechanical strength.

The marker lines in this case comprise weld beads 30 and grooves 32, which have been shown schematically in FIG. 1.

In order to simplify the drawing, a single weld bead 30 and a single groove 32 have been shown in FIG. 1.

The weld beads 30 are formed at the interface between the film 22 and the card body 12 so that they create zones in which the mechanical strength of the film 22 with respect to being peeled off is higher than in zones of the film 22 which are simply bonded to the card body 12.

Thus, if an attempt is made to peel off the film 22 from the card body 12, the portions of the film 22 which do not comprise a weld bead 30 will be peeled off more easily than the portions of the film 22 which comprise weld beads 30, which latter portions will remain secured to the card body 12 and will cause the film 22 to tear at the join between the two type of portions, thereby causing the film 22 to rip.

The grooves 32 in this case pass through the entire thickness of the film 22, thereby forming cuts in the film 22 so that the join between the portions of the film 22 which are adjacent to these grooves 32 is weakened and therefore has very little mechanical strength.

Thus, if an attempt is made to peel off the film 22 from the card body 12, the portions adjacent to the grooves 32 will separate, thereby causing the film 22 to rip.

Ripping of the film 22 prevents it from being reused, and the portions of film 22 which remain fixed to the card body 12 by the weld beads 30 will impair the surface finish of the card body 12.

Consequently, any attempt to falsify the card 10 will be noticeable in the form of visible defects in the layers 12, 22, 28 of the card 10.

It will be noted that the zones of reduced or increased mechanical strength in the film 22 form tear scores so that, if an attempt is made to peel off the film 22, the latter will tend to rip at the point of separation between the zones of high mechanical strength and the zones of lower mechanical strength.

According to one variant embodiment (not shown) of the invention, the grooves 32 may be formed on one of the faces of the film 22 without passing through the entire thickness of the film 22. Such a type of groove 32 then forms tear scores which are designed to tear if an attempt is made to peel off the film 22.

Advantageously, as shown in FIG. 2, the weld beads 30 and the grooves 32 may be produced in the form of lines which are fine enough to make it possible to depict motifs 34, 36 which are visible from outside through the film 22 and the film 28.

According to the embodiment shown here, the weld beads 30 and the grooves 32 depict a main identification motif 34 which may represent for example a logo or a stamp, with a view to facilitating visual identification of the card 10.

The weld beads 30 and the grooves 32 in this case depict a secondary motif 36 which represents wavy lines passing over the entire surface of the card 10. This secondary motif 36 facilitates the detection of visible defects on the card 10.

Advantageously, the marker lines 30, 32 may be arranged in sensitive zones of the card 10, that is to say the zones which are most likely to be peeled off, for example around the photograph 18 or close to the edges of the card 10.

Of course, the marker lines 30, 32 may be discontinuous and they may be formed by a series of dots.

According to one variant embodiment (not shown), the marker lines 30, 32 may consist solely of weld beads 30 or solely of grooves 32.

With reference to FIGS. 3A to 3D, a description will now be given of a method of manufacturing the card 10 in accordance with the teaching of the invention.

Figure 3A:
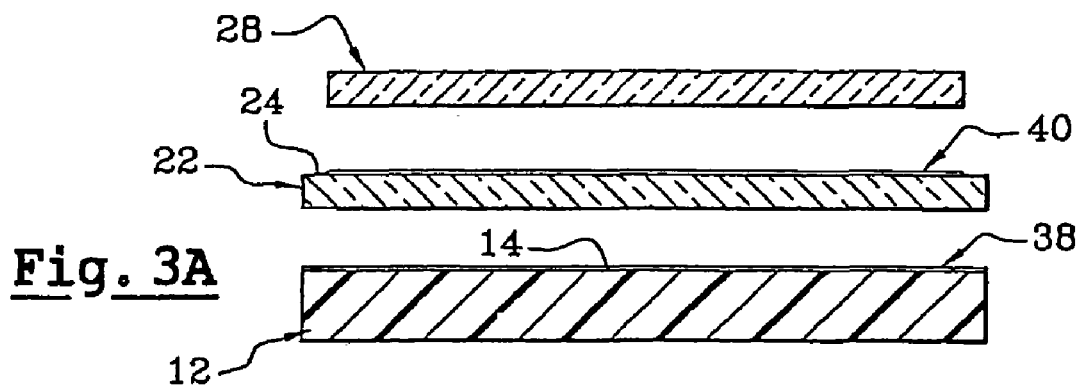
FIGS. 3A, 3B, 3C and 3D are views similar to that of FIG. 1 which show a method in accordance with the teaching of the invention for manufacturing the card of FIG. 1.
Figure 3B:
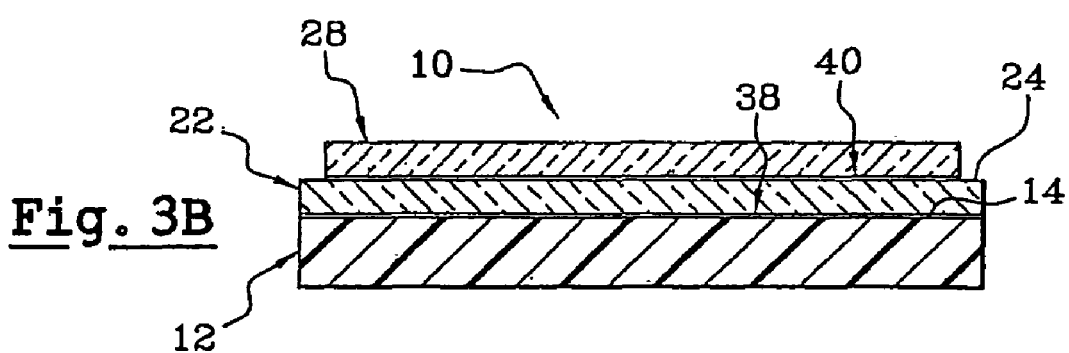
Figure 3C:
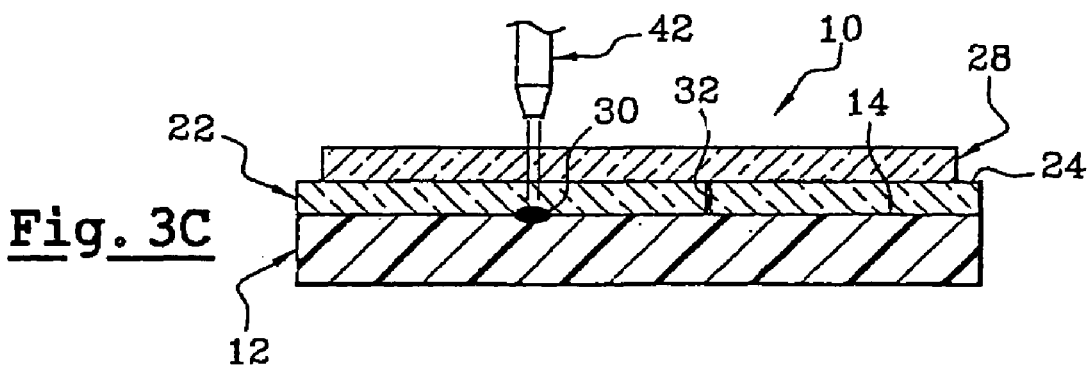

During a first "assembly" step, which is shown in FIGS. 3A and 3B, the two first layers 12, 22 forming the card 10 are fixed together, in this case by bonding.

To this end, according to the embodiment shown in FIG. 3A, a first layer 38 of an adhesive coating is applied to the lower face 15 of the transparent film 22.

The card body 12 and the film 22 are then superposed in the direction of their thickness, and then these two layers 12, 22 are hot-laminated. This ends the assembly step.

Of course, the fixing of the film 22 to the card body 12 may be carried out by other means, for example by cold fixing means, by crosslinking, etc.

During a second "personalization" step, which is shown in FIG. 3B, the personal information 16, 26 is provided on the card 10.

According to the embodiment shown here, the personal information 26 is printed on the upper face 24 of the transparent film 22, for example by thermal transfer, or by any other suitable printing means.

The personal information 16 is provided on the upper face 14 of the card body 12 by means of a laser beam 42.

During a third "security" step, the marker lines, in this case weld beads 30 and grooves 32, are formed by means of a laser beam 42 which passes through the transparent film 22.

The weld beads 30 and the grooves 32 are obtained by selecting a given power of the laser beam 42 and optionally by selecting a given focal point of the laser beam 42 in the thickness of the film 22.

The choice of frequency of the laser pulses, the speed of travel of the laser beam 42 and the choice of material forming the transparent film 22 also have an influence on the technical effect obtained by the laser beam 42.

Since the card body 12 is opaque, the laser beam 42 can pass through the transparent layer 22 but is stopped at the interface between the card body 12 and the film 22.

It will be noted that the carrying out of the security step by means of a laser beam 42 makes it possible to form grooves 32 of varying shape, for example of the same shape as the personal data 16 or 26.

Advantageously, the laser beam 42 used to form the marker lines 30, 32 is of the same type as that used to personalize the card 10.

Figure 3D:
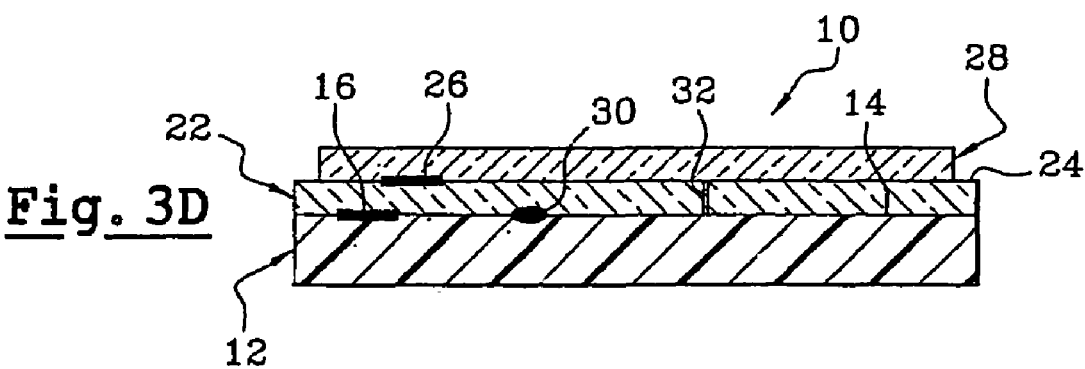

During a fourth "protection" step, which is shown in FIG. 3D, the transparent protective film 28 is fixed to the upper face 24 of the transparent film 22, for example by bonding.

According to one variant embodiment (not shown) of the method according to the invention, the security step may be carried out after the protection step. In this case, the grooves 32 formed by means of the laser 42 pass through the transparent film 28 and the film 22.

This variant embodiment has the advantage of allowing all the layers 12, 22, 28 of the card 10 to be made secure at the same time, including the making secure of a paper layer if there is one.

It will be noted that the security step may be carried out before or after the personalization step. It may also be carried out between providing the personal information 26 and providing the personal information 16.

Of course, the grooves 32 which form tear scores in the film 22 may also be produced using mechanical means. However, in the application of the invention to laminated multilayer cards 10 it is preferable, in particular for reasons of cost and manufacturing simplicity, to use the local application of heat after the assembly step.

The method according to the invention makes it possible to make the card 10 secure in an economical manner, with high positioning accuracy of the marker lines 30, 32.

According to one variant embodiment (not shown) of the method according to the invention, the local application of heat which makes it possible to form the weld beads 30 may be carried out by hot-marking using heat masks.

The design of the mask is determined by the position of the sensitive zones of the card 10, for example of the photograph.

The mask is applied to the card 10 by a machine such as a hot press for applying holograms and producing signature plates.

The mask heats the plastic layers 12, 22, 28 until the plastic melts so as to weld the various layers 12, 22, 28 to one another.

The heating of the plastic may be obtained by preheating the mask, for example using an electrical system, or directly by high frequencies or microwaves.

The invention also aims to provide a personalized support in which the marker lines are produced in such a way that they correspond to cutting of the film located on the surface of the card with marking and/or burning of the adjacent lower surface along and in line with these lines. The marking and/or burning may also be accompanied by a welding of the edges of the groove resulting from the cutting to the adjacent surface. These operations are carried out by a single pass or possibly two passes of a laser beam. The invention is notable in particular in that, in line with and along the grooves resulting from the cutting lines, marks and/or welds are found on the lower surface in contact with the film.

The invention claimed is:

1. Personalized multilayer support in the general shape of a card, such as an identification card, comprising:
    a card body which is provided on an upper face with personal information which is visible from the exterior of the support,
    an at least partially transparent film which is fixed to the upper face of the card body, and
    marker lines comprising weld beads formed at the interface between the film and the card body, the weld beads delimiting zones of the film having increased mechanical strength with respect to the film being peeled off the card body, the marker lines forming tear scores so that the film is torn at the tear scores if an attempt is made to peel off the film, wherein the marker lines depict at least one identification motif which is visible from the exterior of the support.

2. Support according to claim 1, wherein the marker lines further comprise grooves formed in at least one of the faces of the film.

3. Support according to claim 2, wherein the grooves pass through the entire thickness of the film.

4. Support according to claim 1, wherein the marker lines further comprise grooves on at least one face of the transparent film and marks and/or welds at the interface between the transparent film and the adjacent card body.

5. Support according to claim 1, wherein the upper face of the transparent film is covered with a transparent protective layer.

6. Method of manufacturing a personalized multilayer support in the general shape of a card, such as an identification card, comprising:
    an assembly step, during which an at least partially transparent film is fixed to the upper face of a card body,
    a personalization step, during which personal information is placed on the upper face of the card body so that the personal information is visible from the exterior of the support through the transparent film, and
    a security step that is carried out after the assembly step, during which marker lines are produced by means of a laser beam so as to form weld beads at the interface between the transparent film and the card body, the weld beads delimiting zones of the film having increased mechanical strength with respect to the film being peeled off the card body, the marker lines forming tear scores with a view to causing the film to be torn at the tear scores if an attempt is made to peel off the film.

7. Method according to claim 6, wherein marker lines are produced by forming grooves on at least one face of the transparent film.

8. Method according to claim 6, wherein marker lines are produced by forming grooves on at least one face of the transparent film and marks and/or welds at the interface between the transparent film and the adjacent card body, in line with the grooves.

9. Support according to claim 1, wherein at least a portion of the marker lines are of the same shape as at least a portion of the personal information.

10. Method according to claim 6, wherein at least a portion of the marker lines are of the same shape as at least a portion of the personal information.

* * * * *